UNITED STATES PATENT OFFICE.

AUGUST KRANZ, OF CLEVELAND, OHIO.

DYNAMITE.

SPECIFICATION forming part of Letters Patent No. 506,784, dated October 17, 1893.

Application filed February 18, 1893. Serial No. 462,897. (No specimens.)

*To all whom it may concern:*

Be it known that I, AUGUST KRANZ, a citizen of Germany, and a resident of Cleveland, county of Cuyahoga, State of Ohio, have invented certain new and useful Improvements in Dynamite Compositions, of which I hereby declare the following to be a full, clear, and exact description, such as will enable others skilled in the art to which it appertains to make and use the same.

My invention relates to improvements in dynamite compositions, and its objects are to provide a composition incapable of detonating under friction alone, but requiring the influence of a high degree of heat, as well as percussion, to accomplish this.

My invention consists in the combination of ingredients composing the main composition with the auxiliary detonator or primer, as hereinafter described, and claimed with the proportion of parts and manner of admixing them specified.

The main body of my composition consists in the following ingredients in the proportions named:—

|   | Per cent. |
|---|---|
| Nitro glycerine | $87\frac{1}{2}$ |
| Camphor | $1\frac{1}{2}$ |
| Gun cotton, or collodion cotton | $3\frac{1}{2}$ |

The second portion consists in—

| | |
|---|---|
| Linseed oil and oil of turpentine treated with nitrate of ammonia and sulfuric acid | $7\frac{1}{2}$ |
| Total | 100 |

To compose the second portion of linseed oil and oil of turpentine treated with nitrate of ammonia and sulfuric acid, linseed oil and turpentine are mingled in the proportions of one part of oil to four parts of turpentine. Nitrate of ammonia is then added at a medium heat. The amount required is one and two-thirds parts. These ingredients are then mingled with 6.5 parts of sulfuric acid of 66° strength (Baumé) at 65° Fahrenheit. The purpose of the sulfuric acid is to decompose the nitrate of ammonia setting nitric acid free, which together with the excess of sulfuric acid effects the oxidation of the mixture of linseed oil and turpentine. After treatment with the acid, it is afterward washed out with a bath of water and carbonate of soda. This compound of linseed oil and oil of turpentine treated with nitrate of ammonia and sulfuric acid prevents explosion under all common shocks as concussion.

The final composition is effected in the following manner:—Acetone and sulfuric ether are employed to dissolve the nitro-glycerine; next mix in the camphor; after the camphor is thoroughly dissolved, mix in the gun cotton, very dry and stir the compound for about twenty minutes at a medium degree of heat (75° Fahrenheit). Then mix into the gelatine thus formed the nitrated linseed oil and oil of turpentine treated with nitrate of ammonia and sulfuric acid. Stir this mixture for about twenty minutes. After about thirty minutes' rest, heat it to 100° to 105° Fahrenheit, and keep on stirring accompanying the stirring with strong air circulation for from fifteen to twenty minutes; then stir until cooled to 75° again, and the mixture will be completed. It should then be of a light brown color. It is of importance to dry the nitro-glycerine thoroughly.

This explosive is not affected by heat at a less degree than 560° Fahrenheit and freezes at 38° Fahrenheit. The force of a rifle bullet will not detonate it.

A special primer or detonator is required for this composition, which is not of the spirit of this invention. It must produce both the high degree of heat, as well as the intense concussion requisite.

Slight modifications in the proportions may be made without greatly affecting the value of the composition.

The proportions of acetone and sulfuric ether employed in dissolving the nitro-glycerine should be five parts of sulfuric ether to one part of acetone.

The gun cotton should also be thoroughly dried.

The proportions of nitro-glycerine to acetone and sulfuric ether should be as one to one-half or sufficient to dissolve the gun cotton, which should be easily soluble.

Having described my composition and manner of composing it, what I claim is—

1. The herein-described dynamite composition consisting of nitro-glycerine, camphor, and gun-cotton combined with linseed oil and oil of turpentine treated with nitrate of ammonia and sulfuric acid, in the manner and proportions specified.

2. The herein-described dynamite composition consisting of nitro-glycerine camphor, and gun cotton dissolved in acetone and sulfuric ether, combined with a composition of linseed oil and oil of turpentine treated with nitrate of ammonia and sulfuric acid, in the manner and proportions specified.

In testimony whereof I hereby set my hand this 8th day of February, 1893.

AUGUST KRANZ

In presence of—
WM. M. MONROE,
WILLIAM SCHLOSSER.